Figure 1:
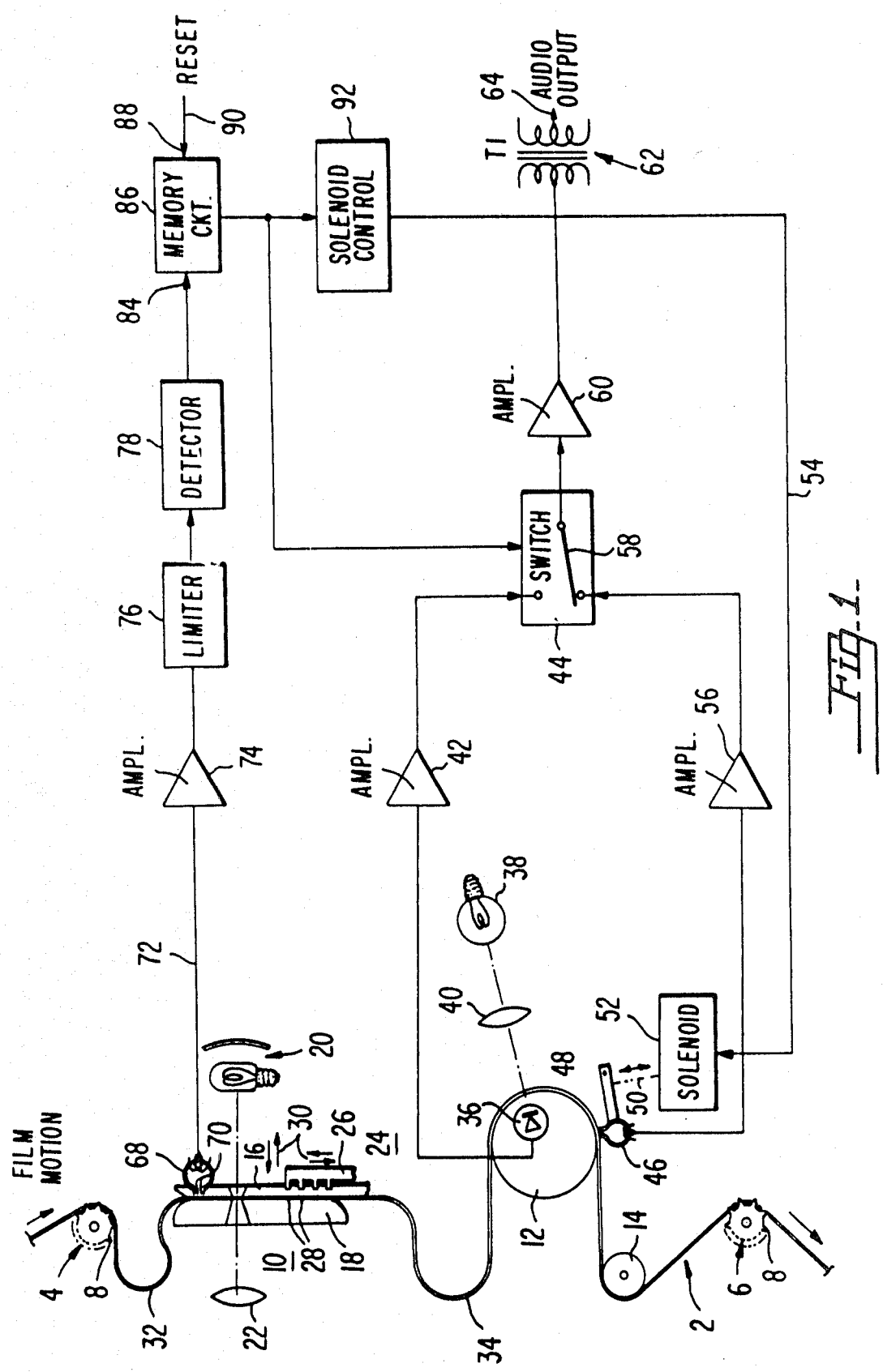

United States Patent [19]
Fisher

[11] B 3,915,566

[45] Oct. 28, 1975

[54] AUTOMATIC SIGNAL PLAYBACK FOR FILM PROJECTORS

[75] Inventor: William Francis Fisher, Philadelphia, Pa.

[73] Assignee: RCA Corporation, New York, N.Y.

[22] Filed: Oct. 10, 1973

[21] Appl. No.: 405,137

[44] Published under the Trial Voluntary Protest Program on January 28, 1975 as document no. B 405,137.

[30] Foreign Application Priority Data
Mar. 20, 1973 United Kingdom............... 13266/73

[52] U.S. Cl.................................. 352/10; 352/10 X
[51] Int. Cl.²......................................... G03B 31/02
[58] Field of Search ...................... 352/7, 8, 10, 29

[56] References Cited
UNITED STATES PATENTS

| | | |
|---|---|---|
| 2,756,277 | 7/1956 | Good et al........................ 352/10 X |
| 3,150,810 | 9/1964 | Heaton ............................ 352/10 X |
| 3,404,932 | 10/1968 | Peirez et al...................... 352/10 X |

Primary Examiner—Fred L. Braun
Assistant Examiner—Michael L. Gellner
Attorney, Agent, or Firm—E. M. Whitacre; M. DeCamillis

[57] ABSTRACT

Apparatus is provided for automatically enabling portions of a film projector system to recover information on the film which may be recorded in optical or magnetic form. An auxiliary magnetic pickup device is provided in preceding relation to the normal transducing portion of the film path. The auxiliary pickup is preferably spaced from the film and advantageously located to cooperate with the film portion which is under the influence of the intermittent device of the projector system.

4 Claims, 2 Drawing Figures

AUTOMATIC SIGNAL PLAYBACK FOR FILM PROJECTORS

This invention relates to motion projectors for films and more particularly to apparatus for automatically providing reproduction of information signal portions recorded in either magnetic or optical form on the film.

At present there exist films which utilize either an optical or a magnetic track or both for providing signal information such as speech or music. Therefore, there is a need for motion picture projector means which are adapted to reproduce both the optical track and the magnetic track.

Non-automatic systems exist wherein the type of sound information contained in the film must be first determined and then a manual control utilized to select appropriate playback means in the projector apparatus. This is time consuming, if accomplished prior to playback of the film and may result in loss of sound information if accomplished during playback of the film. In addition, it may be required to project or playback a series of separate films in an unbroken sequence, where the type of sound recording utilized for a given film is unknown and where manual determination of such is impractical. Thus, there is a need for an apparatus, such as disclosed herein, which automatically adapts itself for playback of sound or other information from the film, which was recorded in optical or magnetic form. It is further desirable that such be accomplished with the minimum amount of added complexity to the projector system and in a manner which will not disrupt or degrade the otherwise normal performance of the projector apparatus.

Briefly in accordance with the invention there is provided apparatus for transducing a magnetic or an optical information track with a film in a motion picture film projector which has means for advancing the film along a predetermined path including a projection station. Optical transducing means and first magnetic transducing means are provided in the film path. Further magnetic transducing means are disposed in preceding relation to the first magnetic transducing means along the path. Switching means are provided for selecting an output from one of the optical and first magnetic transducing means. And means coupled to the further magnetic transducing means controls the operation of the switching means.

Figure 2:
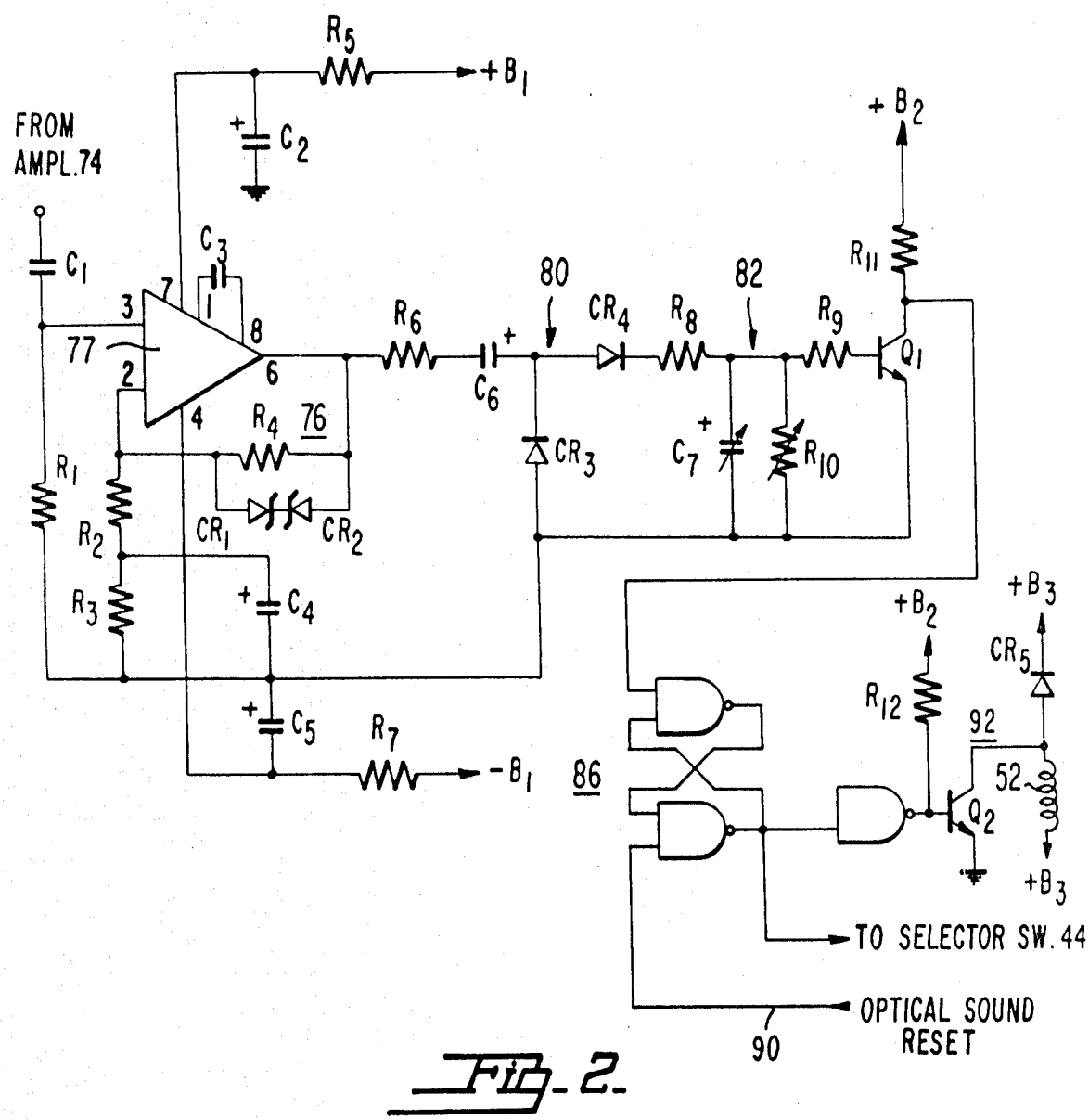

The content and operation of the invention will best be understood by a consideration of the following description in conjunction with the drawing, in which:

FIG. 1 is a view of a sound film projector apparatus in block form which embodies the invention; and FIG. 2 is a diagram in schematic form of a portion of the circuitry of the arrangement of FIG. 1.

FIG. 1 shows, in simplified form, a motion picture film projector playback system. The film 2 for use with such a system is of the type in which signal information such as sound may be recorded in known optical or magnetic form. The system includes a pair of sprocket members 4 and 6 which are disposed in relative spaced relation. The sprocket members are rotatably driven by means not shown and include tooth portions 8 engaging the film 2 for imparting motion thereto. The sprocket members 4 and 6 advance the film 2 along a path extending from sprocket means 4 in looped manner through a projecting station 10 about a sound drum 12 and damper roller 14 to the other sprocket means 6.

The projecting station 10 includes an aperture plate 16 and a film pressure shoe 18 which are arranged in yieldable urging relation, by means not shown, for holding a portion of the film 2 therebetween. Projection of the visual image portion of the film is provided by the lamp 20 and lens arrangement 22 shown.

A device well known in the art as an "intermittent" 24, including a claw member 26 which engages sprocket holes 28 in the film, is movable as indicated by the arrows 30 to cause movement of the film through the projecting station 10. Movement of the film 2 through the projecting station 10 is comprised of a series of stationary and rapid movement conditions of the film. The rapid movement of the film by the intermittent device 24 is at a substantially higher rate than the rate of film advance provided by the sprocket members 4 and 6. To facilitate such operation film loops 32, 34 are provided both preceding and following the projecting station 10.

Following passage through the projecting station 10 the film passes about the sound drum member 12. Mounted in the sound drum member is an optical detecting device 36 such as a light-sensitive diode. The optical detecting device 36 is positioned to receive light from an exciter lamp 38 and lensing arrangement 40 passed through the film 2 disposed on the sound drum. The output of the optical detecting device 36 is applied through a known pre-amplifying means 42 to one input of a switch 44. The switch 44 may take the form of one of many known mechanical or electronic switching devices.

A magnetic head or pickup device 46 is secured to an arm 48, which is pivotally mounted to provide movement of the magnetic pickup 46 toward and away from the film disposed around the drum 12. The arm is mechanically coupled 50 to a mover member such as the solenoid 52. For one condition of the solenoid 52, the pickup device 36 is disposed in contacting cooperative transducing relationship with the magnetic information track of the film 2. For a further condition of the solenoid 52, the pickup device 46 is disposed in spaced relation with the film portion about the drum 12. Control of the solenoid device 52, which is in accordance with a control signal on lead 54, will be discussed more completely hereafter.

The magnetic pickup device 46 is also coupled through a know pre-amplifying means 56 to a second input of the switch means 44. The wiper 58 of switch means 44 is coupled through a further amplifier 60, of known type, and a transformer 62 to provide an output at terminal 64. To provide control of the switch means 44, a further magnetic pickup device 68 is provided along the film path in preceding relation to the drum pickup devices 36, 46 described above. The magnetic pickup devices 46, 68 may take the form of a pair of closely spaced pole pieces 70 in a magnetic circuit about which a coil is wound. For reasons hereinafter discussed, it is particularly advantageous to mount the further pickup 68 so as to cooperate with a portion of the film 2 whose movement is influenced by the intermittent 24. As shown in FIG. 1, the pickup 68 is fixedly mounted in the aperture plate 16 of the projecting station 10. This may be accomplished by any known suitable holding means, not shown. It will be noted that the pole pieces defining the gap in the pickup device are mounted in the aperture plate 16 so as to be spaced from the film 2 passing through the projecting station 10. The clearance between the magnetic track on the film and the pole pieces 70 of the pickup, which for example may be 0.001–0.002 inches, prevents scratching of the film and wear of the pickup 68.

As previously indicated, the film moves through the projecting station, due to the action of the intermittent 24, in a succession of rapidly accelerating and decelerating motions interspersed by periods of rest. Thus, in a film projector operating at 24 frames per second this results in two bursts of signals from the magnetic information track of approximately five milliseconds duration in an interval of 83 milliseconds. The average signal frequency is therefore 8.3 times the original frequency recorded on the film.

It will be noted that the location of the pickup device 68 is such that a sound program passes this point before it reaches the drum 12, which is the usual sound pickup point in a projector system. Further, the location of the pickup 68 is at the higher film speed portion of the path provided by the intermittent 24. This is helpful to compensate for the loss in sensitivity due to the separation between the film 2 and the pickup 68, which increases very rapidly at the higher frequencies. More particularly, such location of the pickup 68 enables the production of an output signal on lead 72 which is proportionally higher than at normal film speed and permits roll-off of frequencies below 400 Hz to discriminate against interference such as power line frequency.

The magnetic track information on the film 2, which may be in modulated form, is recovered by the pickup device 68 and fed to a known form of low noise pre-amplifying device 74. The frequency response of the pre-amplifying device 74, for example, may have 3 dB roll-off points of 400 Hz and 25 KHz which correspond to recorded frequencies in the audio range of 50 and 3000 Hz. Due to separation loss, higher frequency signals are greatly attenuated. The output of the pre-amplifying device 74 is fed to a known type of limiter 76 operable at the frequencies indicated above. As shown in FIG. 2, the limiter 76 may be a feedback type, utilizing a high gain amplifying device 77 such as operational amplifier type μ748 of the Fairchild Semiconductor Corporation, Mountain View, California. The limiter 76 is effective to limit the energy content of short noise pulses due to the operation of the projector or other equipment. The output of the limiter 76 is fed to a known type of detecting and holding device 78. For example, as shown in FIG. 2, this may include a diode network 80 and capacitive holding circuit 82. It has been found that the presence of normal speech or music recorded 25–30 dB below normal recording level can be reliably detected.

The output level of the detecting device 78, which is indicative of the presence of magnetic information on the film, is coupled to a first input 84 of a memory circuit device 86. The memory circuit device 86 includes a further input 88 on lead 90 which is utilized to initialize or dispose the memory circuit 86 in a given condition. The memory device 86, for example, might comprise a bistable flip-flop in which one state is established by the input from the detector 78 and the other of the states is established by the input on lead 90. Such an arrangement using logic gates is shown in FIG. 2. The output of the memory circuit 86 is coupled as a control input to the switch 44. The memory circuit 86 and switch 44 states are arranged such that a detected presence of magnetic information from the pickup 68 causes the switch 44 to be disposed to provide an output at terminal 64 from the pickup 46.

The output of the memory circuit 86 is also applied to a solenoid control device 92. The solenoid control device 92 may, for example as shown in FIG. 2, include a transistor in circuit with the control winding of the solenoid 52 and which is responsive to the output of the memory circuit 86 for controlling the energization or non-energization of the solenoid.

In operation of the system, a momentary control signal is initially applied on lead 90 to the memory circuit 86. The control signal may be provided from a signal source under the control of a mode switch, not shown, such as utilized for the threading or cueing cycle of the projector. In response to the momentary presence of the signal on lead 90, the memory circuit 86 output is conditioned for optical information playback. The memory circuit output causes the wiper 58 of switch 44 to be disposed to feed the output from the pre-amplifier 42 to output terminal 64. At this time the memory circuit 86 to the solenoid control 92 causes the solenoid 52 to move arm 48 to dispose the pickup device 46 in spaced relation to the drum 12. Thus, the projector system is disposed for an assumed condition of playback of optical signal information from the film 2.

The film is advanced through the projecting station 10. The magnetic information signal pickup device 68 with its associated detecting circuitry determines if magnetic information is present or absent on that portion of the film. If no magnetic information is detected, the projector system remains in the condition to playback optical information. However, if magnetic information from the pickup 68 is detected, the condition of the memory circuit 86 is changed by the input on lead 84. The output level of the memory circuit is correspondingly changed. The memory circuit output causes the solenoid 52 to position the pickup device 46 in cooperative relation with the magnetic track of the film on the drum 12. This state of the memory circuit also causes the wiper 58 of the switch 44 to be disposed to output magnetically recorded information from the pickup device 46.

Thus, the projector sound system automatically senses and is disposed to playback magnetically recorded signal information.

It will be noted that the states of the memory circuit are stably established by the respective input 84 and 88 thereto. Thus, the memory circuit 86 can prevent reverting to optical playback during a period of lack of information the magnetic track of the film.

An alternative which may be desirable for certain applications is to omit the memory circuit 86. Thus, the output of the detecting device 78 directly controls both the switch 44 and solenoid control 92. In such an arrangement the projector system reverts to a condition for optical playback a predetermined time interval after the cessation of detection of the magnetic signal recovered by the pickup device 68. The discharge time constant of the holding circuit 82 of the detecting device 78 is chosen to provide a desired predetermined time delay. This may be accomplished by providing a variable parameter device for one or both of the elements R10, C7 in the circuitry of FIG. 2.

What is claimed is:

1. The combination with a motion picture film projector including means for advancing said film along a predetermined path which includes a projection station, apparatus for transducing a magnetic or an optical information track on said film, comprising: optical transducing means and first magnetic transducing means in said film path, further magnetic transducing means disposed in preceding relation to said first magnetic transducing means along said path, switching means for selecting an output from one of said optical and said first magnetic transducing means, and means coupled to said further magnetic transducing means for controlling the operation of said switching means.

2. The invention according to claim 1, wherein said further magnetic reproducing means is disposed in spaced cooperative relation with said film as said film is moved along said path.

3. The invention according to claim 1, wherein said further magnetic transducing means includes means for detecting the presence or absence of magnetically recorded information on said film and means for providing a control signal indicative thereof, and means for applying said signal to control said switching means.

4. The invention according to claim 1, wherein said film advancing means comprises first and second rotatable drive means disposed in relative spaced relation along said film path, with said first and further magnetic transducing means disposed between said first and second film drive means.

* * * * *